Figure 1:
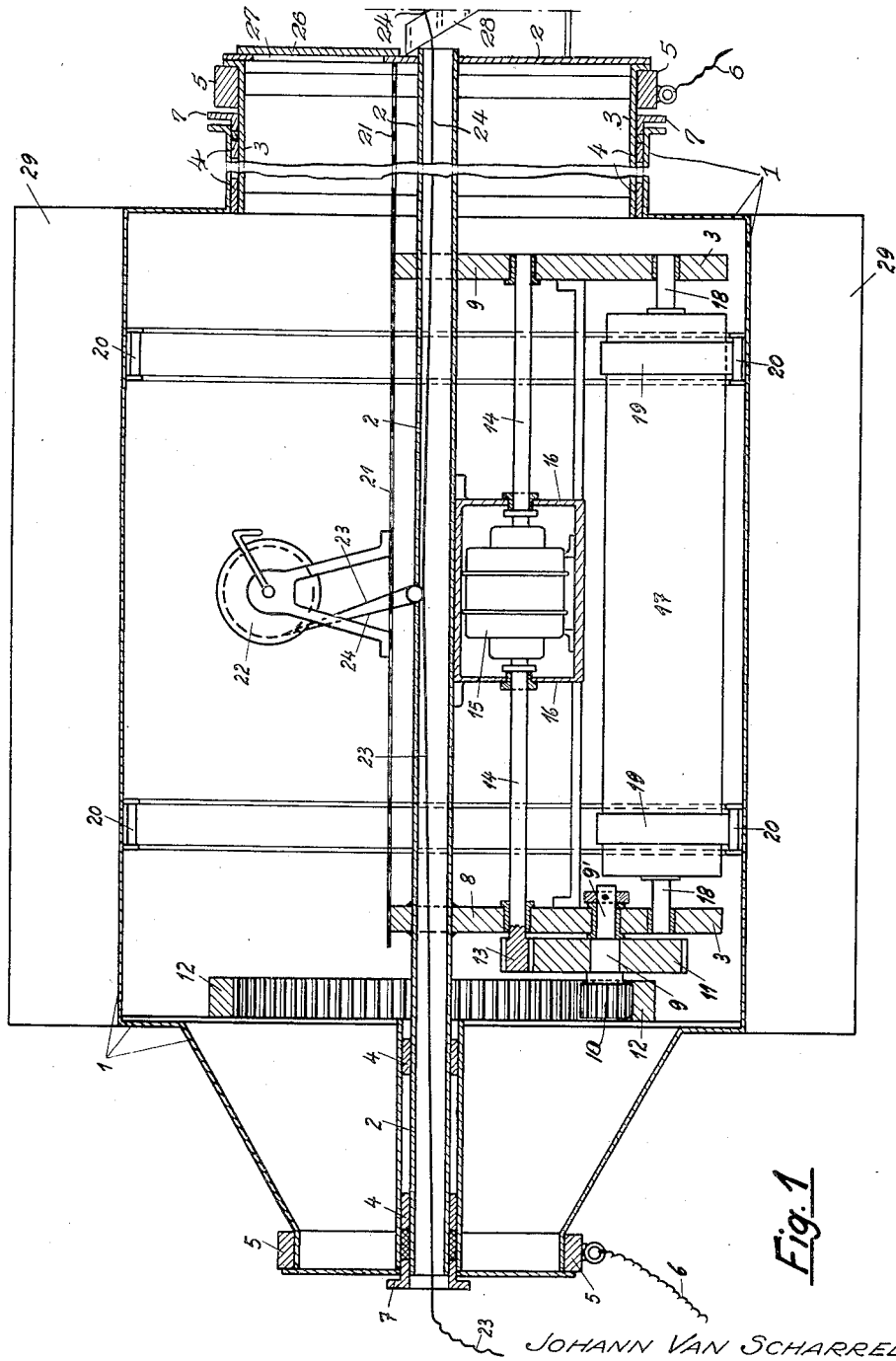

Nov. 26, 1940.  J. VAN SCHARREL  2,222,790
HYDRAULIC POWER PLANT
Filed Feb. 23, 1939  2 Sheets-Sheet 2

JOHANN VAN SCHARREL
INVENTOR
BY Ely Pattison.
ATTORNEYS

Patented Nov. 26, 1940

2,222,790

UNITED STATES PATENT OFFICE 2,222,790

HYDRAULIC POWER PLANT

Johann Van Scharrel, Lake Wilson, Minn.

Application February 23, 1939, Serial No. 257,784
In Germany August 15, 1938

4 Claims. (Cl. 290—54)

This invention relates to a hydraulic power plant for flowing water with a vane drive. Where the stream of water is strong owing to a high head the water power has hitherto mainly been utilized by the provision of dams and reservoirs or the like in conjunction with water turbine plants or stationary paddle wheels. Often by-pass canals are also necessary for this purpose for the provision of the necessary difference of level between two surfaces of water. All these plants involve considerable expense in building and upkeep. They also impede the use of the waterways for shipping or render this altogether impossible. Therefore they can also be utilized where the conditions of flow and water head are particularly favourable, for example in the case of mountain streams or the like.

The object of the present invention is the provision of a hydraulic power plant which is as simple and cheap as possible to build and maintain, which may be erected anywhere where there is a somewhat favourable flow, it being also possible to take into account the requirements of shipping.

This is achieved by the fact that as vane carrier a drum is employed, which is rotatably mounted on a stationary shaft and drives a current generator mounted on non-rotating parts, through a gearing. The drum is constructed as a floating body, which carries all gears and current generating means in its interior.

Figure 2:
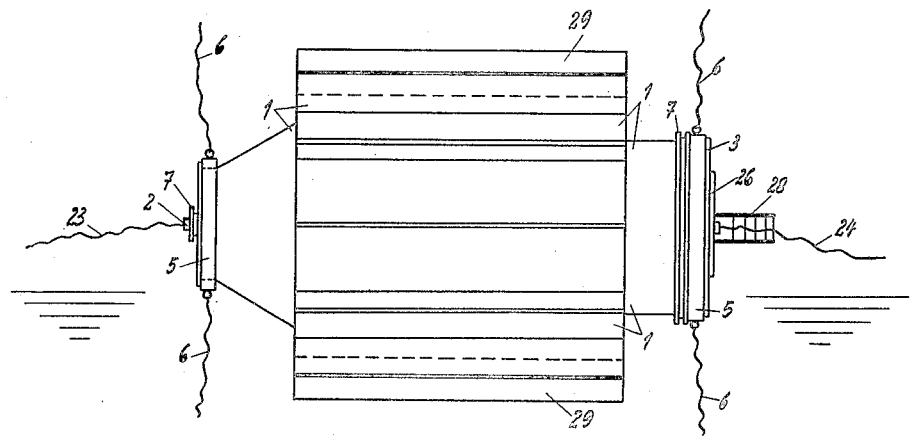
Figure 3:
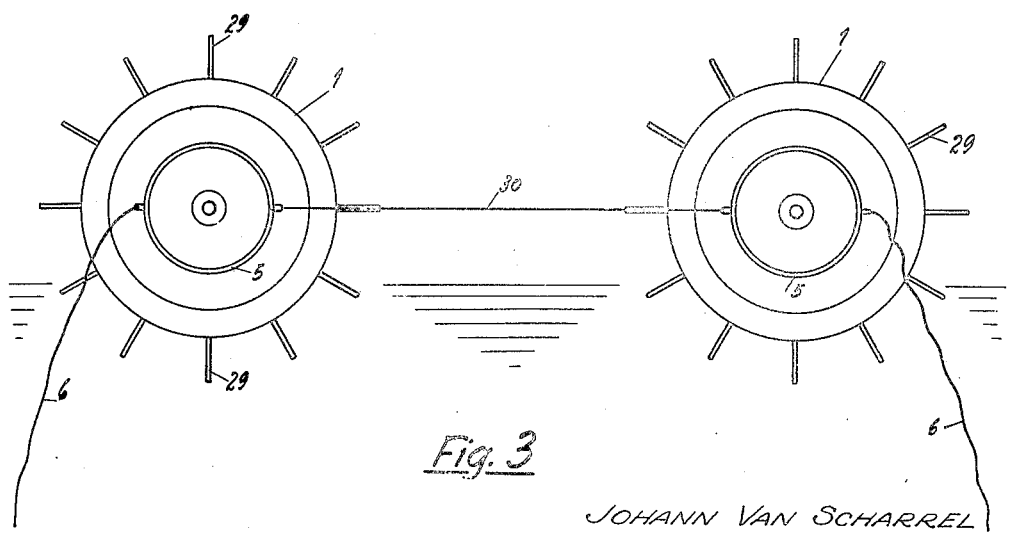

An embodiment of the invention is illustrated in the drawings, wherein:

Fig. 1 is an embodiment of the plant in vertical longitudinal section with the upper part cut away the figure being partly broken away and foreshortened in the forward end of the device, Fig. 2 shows the same embodiment in elevation, Fig. 3 illustrates an embodiment with two drums in side elevation.

In Fig. 1, I is a drum constructed as a floating body which is mounted on a hollow shaft 2 through supports 3 rigidly connected to the shaft with the aid of slide bearings 4 in a rotatable manner. At the ends of the drum I or on the supports 3 extending therefrom rings 5 are rotatably mounted, which are connected by means of chains or cables 6 to anchors or other stationary parts. At the ends of the drum I packings 7 similar to stuffing boxes or the like are disposed between the drum and the hollow shaft 2 of the drum and the support 3. Supporting arms 8, 9 are rigidly connected to the shaft 2. Rotatably mounted in the arm 8 there is a shaft 9' for the gear wheels 10 and 11 rigidly connected thereto, the gears being suitably stepped down and being held in axial direction by a fixing ring. The gear 10 meshes with an annulus 12 rigidly connected to the drum 1. The gear 11 meshes with a pinion 13, the shaft 14 of which is rotatably mounted in the supporting arms 8 and 9 and carries the armature of a generator 15, the casing of which is mounted on a frame 16 rigidly connected to the shaft 2 and the supporting arms 8 and 9.

Furthermore, a smaller drum 17 having trunnions 18 is rotatably mounted in the supporting arms 8 and 9. The drum 17 rotates simultaneously with its periphery or rings 19 seated thereon on slide and guide bearings 20 on the inner surface of the large drum I and may be loaded wholly or in part with liquid or other weight. Furthermore, a platform 21 or the like is fixed to the hollow shaft 2 and carries one or more winches 22. From these cables or chains 23, 24 lead through the hollow shaft 2 to the ends thereof and to anchors or other stationary parts unaffected by the flowing water, for the purpose of anchoring the drum I on opposite sides also in the axial direction. The support 3 rigidly connected to the shaft 2 is sealed outwardly in a fluid tight manner by a wall 25 and has in the part above the shaft 2 a manhole 27 sealed in a liquid tight manner by a cover 26, steps 28 disposed laterally on the support 3 leading to the manhole. The periphery of the drum I is provided with radially extending vanes 29. The arrangement consisting of the parts 1 to 29 may be disposed singly or in groups in streaming water in a floating manner, the drums being disposed with their content in the direction of flow side by side or one behind the other and being anchored with spacing.

Fig. 2 shows a drum I with its anchoring cables or chains in elevation, while Fig. 3 shows two drums I disposed in the direction of flow floatingly, with the anchoring cables and chains. The drums are interconnected at the rings 5 by means of cables or chains 30, while the rings 5 are connected at the ends of the plant to anchors or the like by means of cables 6.

The operation of the hydraulic power plant is as follows:

The drum I is floatingly disposed on the streaming water and is anchored with the aid of the cables 6 in the direction of flow and transversely thereto with the aid of the cables 23 and 24. By this means the hollow shaft 2 is held in a certain position, so that the drum 1 rotates under the action of the streaming liquid due to same impinging upon its outer vanes 29. During this action the shaft 2 and all the parts rigidly connected thereto are held by the vertically depending supporting arms 8 and 9 in a certain position without taking part in the rotary movement of the drum. The annulus 12 of the drum 1 rotates the pinion 10 and the gear 11 mounted on the same shaft 9 and rigidly connected thereto. The gear 11 meshes with the pinion 13 and rotates the shaft 14 on which the armature of the generator is fixedly mounted. The drum 17 wholly or partly filled with liquid or some other load and rotatably mounted in the supporting arms 8, 9 prevents the shaft 2 from rotating by putting additional load on the supporting arms 8, 9. Owing to the rolling of the drum 17 on the inner circumference of the drum 1 the inertia of the shaft 2 to rotation with the drum 1 is additionally increased. By means of the gearing 12, 10, 11, 13 the rotary motion of the drum 1 is geared up in such a way that the shaft 14 of the generator 15 reaches the necessary speed of rotation of 1500 to 2000 revolutions per minute. Instead of generators other machines, such as pumps, winches, drums or others may be supported by the arms 8, 9 and driven by the drum 1. The embodiment shown and described may be varied in adaptation to the practical requirements without leaving the scope of the invention.

I claim:

1. A hydraulic power plant for flowing water with a vane drive, comprising a rotatably mounted drum, vanes on the outer circumference of said drum, a stationary shaft supported by the drum, non-rotating parts and loads fixed to said shaft and disposed between the shaft and the lower part of the drum, a current generator mounted on said non-rotating parts and a gearing between said drum and said generator.

2. A hydraulic power plant for flowing water with a vane drive, comprising a rotatably mounted drum, vanes on the outer circumference of said drum, a stationary shaft supported by the drum, non-rotating parts and loads fixed to said shaft and disposed between the shaft and the lower part of the drum, a ballast drum rotatably mounted on the parts connected to the stationary shaft, said ballast drum rolling on the inner circumference of the large drum, a current generator mounted on said non-rotating parts and a gearing between said drum and said generator.

3. A hydraulic power plant for flowing water with a vane drive, comprising a rotatably mounted and anchored drum floatingly disposed on the flowing water, vanes on the outer circumference of said drum, a stationary shaft supported by the drum and transversing said drum, non-rotating parts being suspended on said shaft, loads supported by said non-rotating parts near the lower part of the drum, a current generator mounted on said non-rotating parts between the shaft and the lower part of the drum and a gearing between said rotating drum and said generator.

4. A hydraulic power plant for flowing water with a vane drive, comprising a rotatably mounted and anchored drum floatingly disposed on the flowing water, vanes on the outer circumference of said drum, a stationary shaft supported by the drum and transversing said drum, non-rotating parts being suspended on said shaft, loads and a current generator supported by said non-rotating parts between the shaft and the lower part of the drum, a toothed wheel with inner teeth fixed to the drum and a gearing between said toothed wheel and said generator.

JOHANN VAN SCHARREL.